US008099603B2

(12) United States Patent
Libin et al.

(10) Patent No.: US 8,099,603 B2
(45) Date of Patent: Jan. 17, 2012

(54) SECURE ID CHECKING

(75) Inventors: Phil Libin, Cambridge, MA (US); David Engberg, Washington, DC (US)

(73) Assignee: CoreStreet, Ltd., Cambridge, MA (US)

( * ) Notice: Subject to any disclaimer, the term of this patent is extended or adjusted under 35 U.S.C. 154(b) by 1093 days.

(21) Appl. No.: 11/804,798

(22) Filed: May 21, 2007

(65) Prior Publication Data

US 2008/0016370 A1 Jan. 17, 2008

Related U.S. Application Data

(60) Provisional application No. 60/802,462, filed on May 22, 2006.

(51) Int. Cl.
*G06F 21/00* (2006.01)
*G06F 21/20* (2006.01)

(52) U.S. Cl. ............... 713/185; 713/182; 726/2; 726/3; 726/5; 726/9; 726/6; 705/65; 705/64; 705/66; 705/67; 708/135; 708/131; 708/136; 709/227; 709/229; 709/228

(58) Field of Classification Search ..................... None
See application file for complete search history.

(56) References Cited

U.S. PATENT DOCUMENTS

| | | | |
|---|---|---|---|
| 6,072,875 A * | 6/2000 | Tsudik ........................... 380/270 |
| 6,161,185 A * | 12/2000 | Guthrie et al. ..................... 726/5 |
| 6,301,659 B1 | 10/2001 | Micali |
| 6,385,318 B1 | 5/2002 | Oishi |
| 6,487,658 B1 | 11/2002 | Micali |
| 6,504,930 B2 | 1/2003 | Enari |
| 6,766,450 B2 | 7/2004 | Micali |
| 6,961,849 B1 * | 11/2005 | Davis et al. ..................... 713/167 |
| 7,181,017 B1 * | 2/2007 | Nagel et al. ..................... 380/282 |
| 7,565,540 B2 * | 7/2009 | Bogasky et al. ............... 713/173 |
| 7,725,719 B2 * | 5/2010 | Sandberg et al. .............. 713/170 |
| 7,894,600 B2 * | 2/2011 | Sato ................................. 380/44 |
| 2002/0152390 A1 * | 10/2002 | Furuyama et al. ............. 713/185 |
| 2005/0010786 A1 * | 1/2005 | Michener et al. ............. 713/185 |
| 2005/0132194 A1 * | 6/2005 | Ward ............................. 713/176 |
| 2005/0182958 A1 * | 8/2005 | Pham et al. .................... 713/200 |
| 2006/0072745 A1 * | 4/2006 | Fukaya ........................... 380/28 |
| 2007/0168674 A1 * | 7/2007 | Nonaka et al. ................ 713/182 |
| 2010/0117794 A1 * | 5/2010 | Adams et al. ................ 340/5.83 |

OTHER PUBLICATIONS

"Personal Identity Verification (PIV) of Federal Employees and Contractors," *Federal Information Processing Standards (FIPS) Pub. 201*, U.S. Dept. of Commerce, Computer Security Division, Information Technology Laboratory, National Institute of Standards and Technology, Feb. 25, 2005.

* cited by examiner

*Primary Examiner* — Syed A. Zia
(74) *Attorney, Agent, or Firm* — Muirhead and Saturnelli, LLC

(57) ABSTRACT

A cost-effective system that provides for the efficient protection of transmitted non-public attribute information may be used, for example, to control access to a secure area. Encryption of the attribute information may be performed using symmetric encryption techniques, such as XOR and/or stream cipher encryption. A centralized database that stores and transmits the encrypted attribute information may generate the encryption/decryption key based on selected information bytes, for example, as taken from a card inserted into a handheld device used at the secure area. The selected information to generate the encryption key stream may be varied on a periodic basis by the centralized database. Information as to which selected bytes are to be used for a particular access authorization request may be transmitted to the handheld unit or may be input through action of a user of the handheld unit, for example by entry of a PIN code.

15 Claims, 5 Drawing Sheets

SECURE ID CHECKING

CROSS-REFERENCE TO RELATED APPLICATIONS

This application claims priority to U.S. Provisional App. No. 60/802,462, filed May 22, 2006, which is incorporated herein by reference.

FIELD OF THE INVENTION

The present invention is directed to the field of security and, more particularly, to a method and apparatus for secure ID checking.

BACKGROUND OF THE INVENTION

The chaos and confusion that follow emergencies and natural disasters have made it clear that communication and site management need improvement, and that the systems used today may not be reliable in an emergency.

In response to Homeland Security Presidential Directive 12 (HSPD 12), the US Federal government is issuing a single, trusted government-wide credential to all Federal employees and contractors. These IDs are designed to meet a common standard specified in the Federal Information Processing Standard 201 (FIPS 201). Each card has information about the individual's privileges and identity stored on it in a way that is secure and tamper-proof.

In the event of an emergency, those individuals classified as "first responders," including doctors, police officers and firefighters could use their cards to gain access to the emergency site. However, it has been found that in present emergency response systems it is problematic to quickly check that the credentials and privileges stored on the cards are valid. This deficiency may be addressed by using the security cards for identification purposes only and have a secure credential database that transmits attribute information to a device used for controlling access to a secure area.

However, for privacy and security reasons, it may be desirable to protect from unauthorized viewing the transmission of the attribute information for individuals requesting access to a secure area. It is known that such transmission could be protected via a secure hardwired transmission line. However, a secure hardwired transmission line is not cost effective for many applications and, of course, is not an option in instances where wireless communication is used. Thus, in some cases it may be useful to encrypt attribute information. One mechanism for encryption of the attribute information uses asymmetric encryption, such as a public key encryption system. A public key encryption system uses two keys—a public key that may be known to anyone and a private or secret key that is not widely known. When a first user (user A) wants to send a secure message to a second user (user B), he uses user B's public key to encrypt the message. User B then uses her private key to decrypt it. The public and private keys are related in such a way that if the public key is used to encrypt messages, then only the corresponding private key can be used for decryption. For various examples, and further discussion, of public key encryptions systems, see U.S. Pat. Nos. 6,766,450, 6,487,658, and 6,301,659 all to Micali, which are incorporated herein by reference.

A drawback to public key encryption is that it can be costly to administer and maintain for a high volume of users. Thus, such a system may not be cost effective in some situations.

Accordingly, it is desirable to provide a cost-effective system that provides for the efficient protection of transmitted non-public attribute information.

SUMMARY OF THE INVENTION

According to the present invention, a method for secure ID checking includes receiving attribute information, wherein at least a portion of the attribute information is encrypted attribute information The encrypted attribute information is identified in response to an access request initiated by a card. A symmetric decryption key is generated for the encrypted attribute information. The encrypted attribute information is decrypted to generate clear text attribute information. The clear text attribute information is displayed and granting or denying access to a secure area based on said clear text attribute information. The generation of the decryption key may use information on the card. The attribute information may be received from a secure computer.

According further to the present invention, an apparatus is provided for secure ID checking. The apparatus includes machine executable code for receiving attribute information from a secure computer, wherein at least a portion of the attribute information is encrypted attribute information. Machine executable code identifies the encrypted attribute information in response to an access request initiated by a card. Machine executable code generates a symmetric decryption key for the encrypted attribute information. Machine executable code decrypts the encrypted attribute information to generate clear text attribute information. Machine executable code displays the clear text attribute information to enable granting or denying access to a secure area based on said clear text attribute information. The generation of the decryption key may use information on the card. The attribute information may be received from a secure computer.

According further to the present invention, a system is provided for secure ID checking. The system includes a database and an access control device coupled to the database and having a card reader device. The access control device receives attribute information from the database, and wherein at least a portion of said attribute information is encrypted. A decryption device is coupled to the access control device, wherein the decryption device decrypts the encrypted attribute information received from the database, and wherein said decryption device uses a symmetric decryption key. The symmetric decryption key may be generated from information taken from a card read by said card reader device. The database may be a secure computer.

BRIEF DESCRIPTION OF THE DRAWINGS

Embodiments of the invention are described with reference to the several figures of the drawings, in which.

DETAILED DESCRIPTION OF VARIOUS EMBODIMENTS OF THE INVENTION

Figures 1, 2A, 2B:
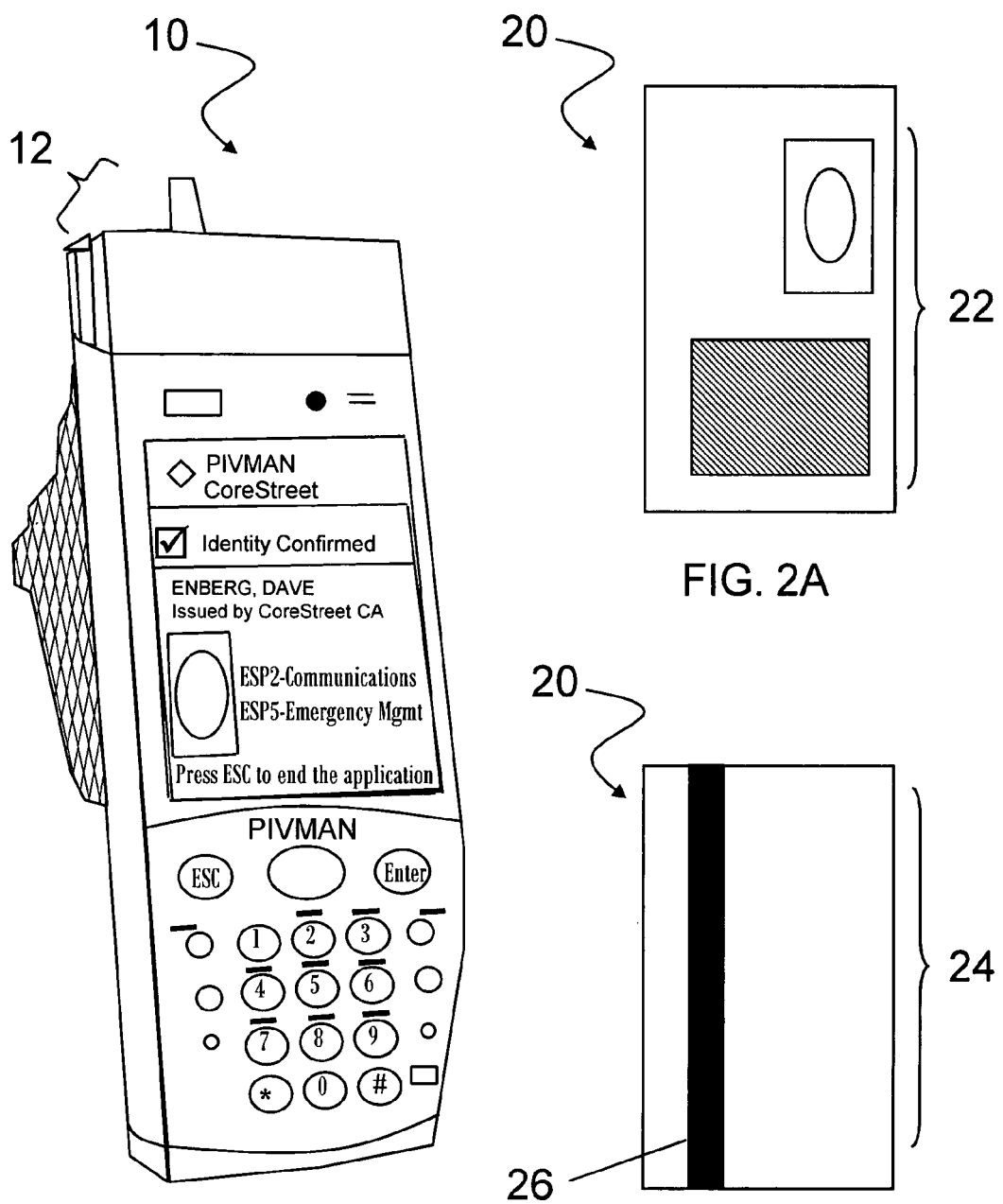
FIG. 1 is an illustration of a handheld device for use in a secure ID checking system according to one embodiment.
FIGS. 2A and 2B are illustrations of the front and back of an ID card suitable for use with the handheld device shown in FIG. 1.

It is to be understood that both the foregoing general description and the following detailed description are exemplary and explanatory only and are not meant to be restrictive of the system described herein. It may be noted that, as used in the specification and the appended claims, the singular forms "a", "an" and "the" include plural referents unless the context clearly dictates otherwise. References cited herein are hereby incorporated by reference in their entirety.

Referring now to the figures of the drawing, the figures comprise a part of this specification and illustrate exemplary embodiments of the described system. It is to be understood that in some instances various aspects of the system may be shown schematically or may be exaggerated or altered to facilitate an understanding of the invention.

In one embodiment, the security system described herein utilizes The PIVMAN™ (trademarked by CoreStreet Ltd.) system for secure ID checking. The PIVMAN system provides immediate, mobile privilege validation of millions of cardholders, even without network connectivity. The PIVMAN system includes server software and handheld devices designed to allow authorized personnel the ability to control access to any site by quickly authenticating and validating the roles and identities of individuals requesting entry to an area. With the PIVMAN system, information on a very large number of individuals—well into the hundreds of millions—can be managed without affecting performance, and without requiring a persistent connection to a data source. These capabilities may be useful in emergencies, such as homeland security incidents or natural disasters, that require the support of various federal, state, and local agencies, as well as private organizations.

With the PIVMAN system, individual cardholder attributes/privileges and identities are drawn from existing independent databases and published to PIVMAN handheld and other devices in a secure format. As a result, when someone presents their smart card, the information on it is validated and the attributes are displayed to the person charged with controlling access. The present system is suitable for use in emergency situations in which access to a secure area must be controlled as well as non-emergency situations, including facilities access, crowd management and mustering to name only a few examples. In fact, the present system is applicable to any situations in which attribute information is transmitted from a centralized database and at least some of the transmitted attribute information is desired to remain non-public information.

FIG. 1 illustrates a handheld device 10 for use in a secure ID checking system, and FIGS. 2A and 2B illustrate the front 22 and back 24 of a card 20 for a cardholder requesting access to a secure area. The card 20 may be inserted into the handheld device 10 or, in a contact-less system, swiped in the vicinity of the handheld device. As shown in FIG. 2A, the front face 22 of the card 20 may include identification information of a cardholder that is visually observable. As shown in FIG. 2B, the back 24 of the card 20 may contain an encoded information mechanism 26 that may be, for example, a magnetic strip or a smart card embedded microprocessor. In one embodiment, the handheld device 10 may be a device made by DAP Technologies of Canada meeting military specifications MIL-STD-810F, IP67. The device may include an information reader 12, including a magnetic strip reader or a smart card reader that operates via contact with a smart card or which may be contact-less. The information reader 12 of the device 10 may further include a barcode scanner 2D imager. The information reader 12 may further include biometric scanning capability, including a fingerprint sensor. The device may have connectivity operability with the Ethernet, GPRS, WiFi, etc.

Figure 3:
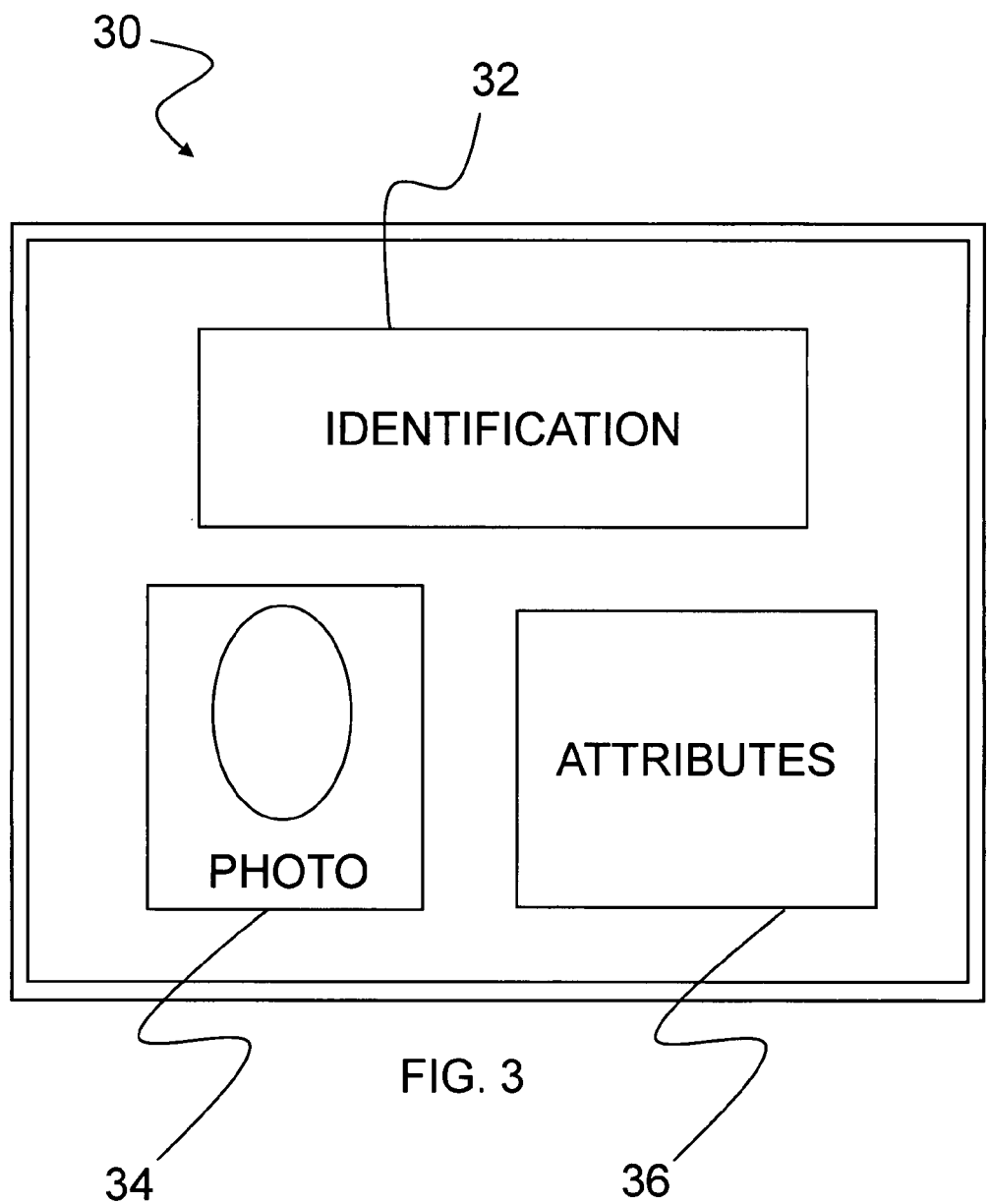
FIG. 3 is a schematic illustration of the display screen of the handheld device of FIG. 1 showing displayed identification and attribute information.

FIG. 3 is a schematic illustration of the display screen 30 of the handheld device 10 showing displayed identification and attribute information after insertion of the card 20 into the handheld device 10. A guard using the handheld device 10 can view the identification information 32 and an ID photo 34 to confirm the identity of the individual requesting access to a secure area, and can view the attribute information 36 of the cardholder that would indicate, for example, whether the identified cardholder is authorized to enter the secure area.

Figure 4:
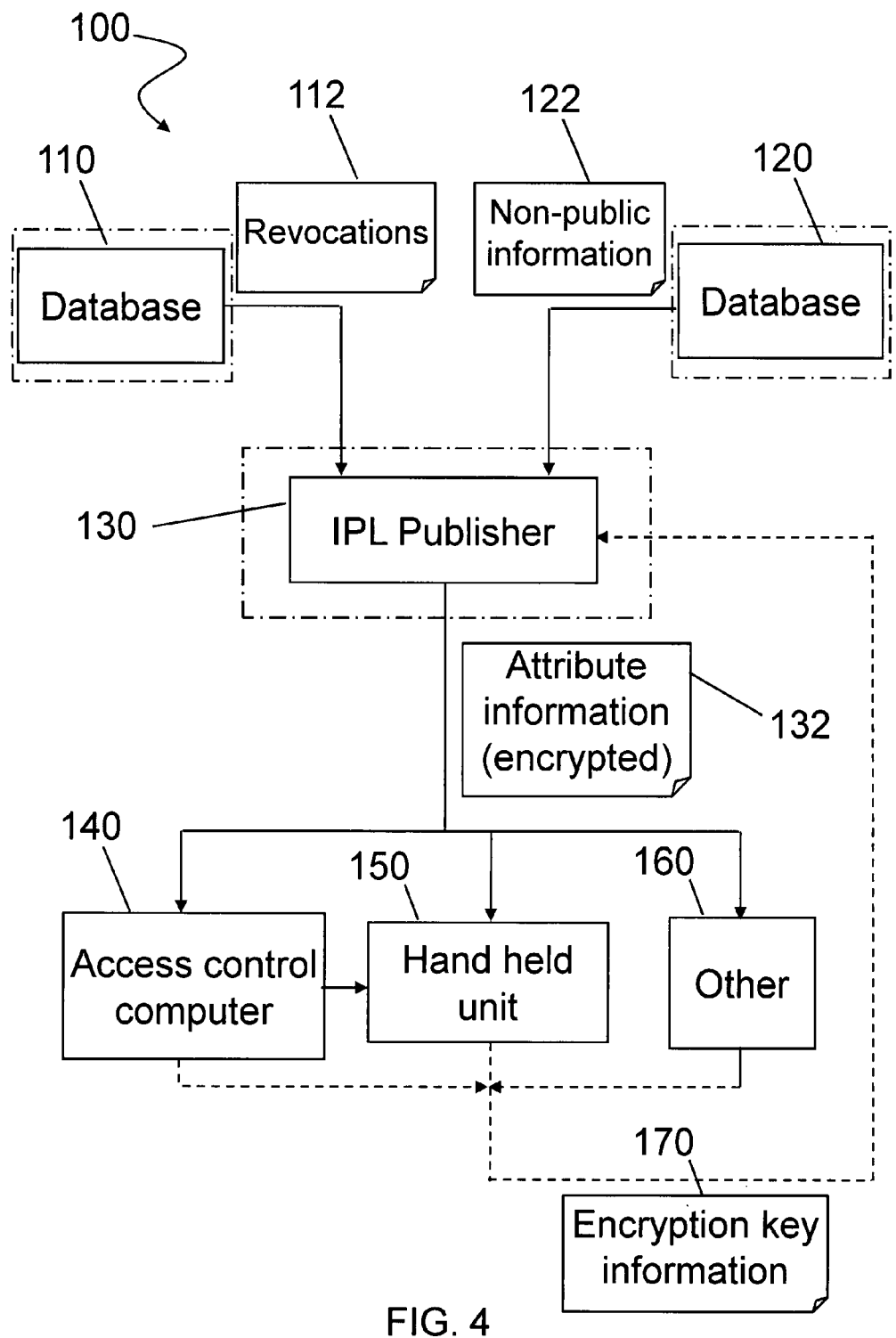
FIG. 4 is a schematic illustration of the secure ID checking system according to the one embodiment.

FIG. 4 is a schematic illustration of the secure ID checking system 100 according to the one embodiment. A secure vaulted computer 130, termed "Identity and Privilege List (IPL) Publisher," receives from vaulted databases 110, 120 public identification information 112 of users for example, concerning revocations of users' access, and non-public information 122, for example attributes (or privileges) of the users. For various security and privacy reasons, it may be desirable to protect the non-public information 122 from unauthorized viewing. The IPL Publisher 130 receives the revocation and non-public information and distributes encrypted attribute information 132, concerning authorizations of the cardholder, to an access control computer 140, mobile handheld device 150, such as a PIVMAN handheld device, and/or other access control unit 160. Alternatively, the mobile handheld device 150 may receive the distributed attribute information 132 from the access control computer 140 that is acting as a management station. In various embodiments, the IPL Publisher 110 may automatically distribute the attribute information at fixed time intervals (hourly, daily, weekly, etc.) or, alternatively, may distribute the attribute information when requested by the access control computer 140, handheld device 150 or other access control unit 160. The distributed attribute information is encrypted in a manner as noted elsewhere herein.

It is possible to encrypt at least some of the attribute information for at least some cardholders using an asymmetric encryption system, such as a public key encryption system. A public key encryption system is discussed elsewhere herein.

In other embodiments, encryption of the attribute information is performed using symmetric encryption system that uses the same key to encrypt and decrypt a message, such as an XOR operation encryption system, a stream cipher encryption system or other known encryption techniques. For example, a stream cipher uses a key derivation function to generate a key stream. Information used for generation of the encryption/decryption key may be taken from information on the card. This information may be previously known to the IPL Publisher or may be determined based on scanning information (e.g., optically scanning) from the inserted card and transmitting the information to the IPL Publisher. In the optional case where scanned information from the card is transmitted to the IPL Publisher for purposes of encryption, FIG. 4 illustrates (by dashed lines) transmission to the IPL Publisher of the encryption key information 170. According to this embodiment, the present system using symmetric encryption techniques offers an advantage, among others, of maintaining the size of the attribute information data as compared before and after decryption.

The IPL Publisher may generate the key stream based on selected information bytes from the inserted card. The selected information to generate the encryption key stream may be varied on a periodic basis by the IPL Publisher (i.e. hourly, daily, weekly, etc.) thus providing additional security. The encryption key stream may be varied on some other basis as well. Information as to which selected bytes are to be used for a particular access authorization request may be transmitted to the handheld unit or may be input through action of a user of the handheld unit. For example, to operate the handheld unit, the handheld user may periodically (e.g. daily) input a PIN code or other password that provides additional security for operation of the handheld unit and which also informs the handheld unit of the particular selected information bytes to be used for the symmetric encryption process. Alternatively, the information input as the PIN code may itself be the information used to generate the encryption key.

Figure 5:
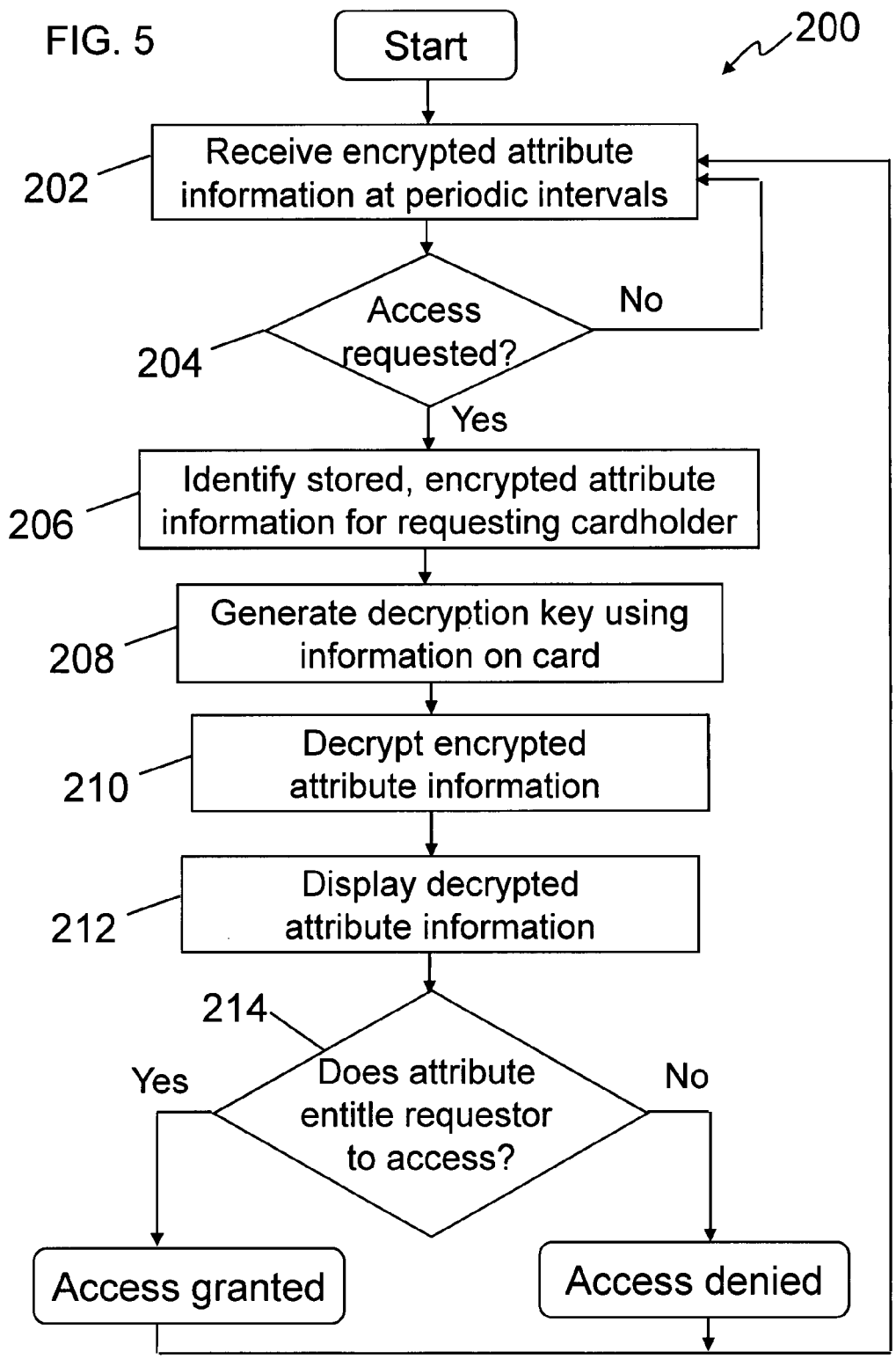
FIG. 5 is a flow chart describing a process of securely checking an ID according to one embodiment.

FIG. 5 is a flow chart describing a process 200 of securely checking an ID according to one embodiment. In this embodiment, real-time access between the handheld unit and the IPL Publisher is not readily available as, for example, in the case of an emergency situation. In a step 202, a handheld unit for controlling access to a secure area receives information pushed from the IPL Publisher, as part of a periodic data download, concerning stored attribute information for all individuals for whom information is stored in the IPL Publisher. The attribute information that is distributed to the handheld unit is encrypted. In a decision step 204, if an access request is made by a cardholder for authorization to enter a secure area, for example by insertion of the individual's card into the handheld unit, authorization processing begins. In a step 206, the encrypted attribute information stored on the handheld device is identified for the requesting cardholder. In a step 208, information associated with the card provides for generation of the key needed to decrypt the attribute information stored on the handheld unit. As further noted elsewhere herein, the key may be generated via an asymmetric encryption process (e.g. public key, private key encryption) or via a symmetric encryption process, such as an XOR operation or a stream cipher operation. Data from the card may be used to generate the decryption key, and the data from the card may be specific data bytes on the card. In some embodiments, the data from the card may be further modified (e.g., by a one-way hash) prior to being used to generate the decryption key. In a step 210, using the decryption key for the XOR or stream cipher techniques on the basis of the specific data from the card, the handheld device decrypts the encrypted attribute information. As part of the step 210, information as to which specific data from the card should be used to generate the decryption key may be conveyed to the handheld unit. In one embodiment, this information is conveyed by means of a PIN number entered by the handheld device user. In a step 212, the decrypted clear text attribute information is displayed on a display portion of the handheld unit. In a decision step 214, an assessment is made whether the individual requesting access is authorized to enter the secure area based on the displayed information. If the cardholder has the appropriate attribute, access is granted, otherwise access is denied. In other embodiments, the system includes machine executable code for carrying out the above-noted steps.

Figure 6:
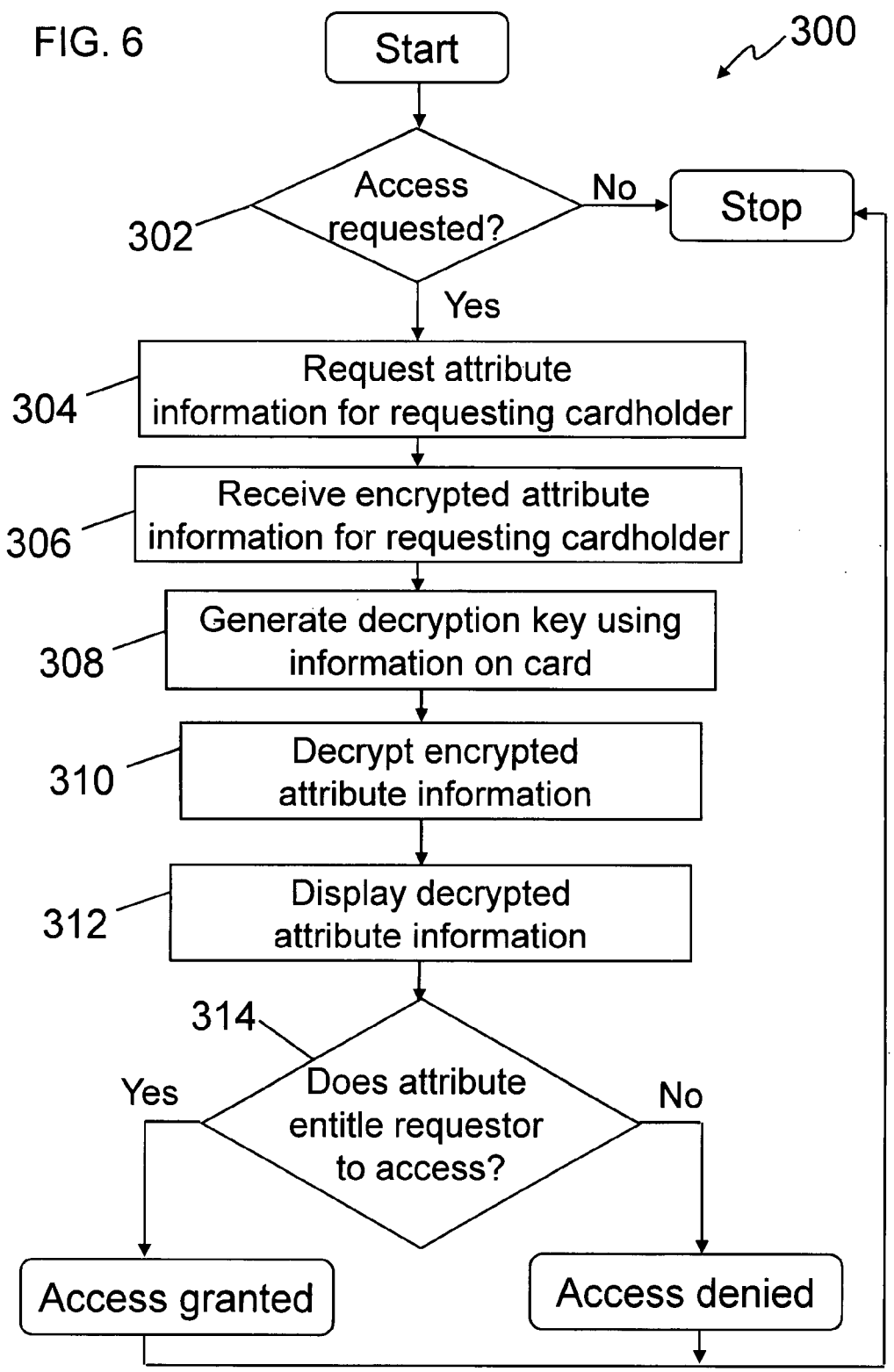
FIG. 6 is a flow chart describing a process of securely checking an ID according to another embodiment.

FIG. 6 is a flow chart describing a process 300 of securely checking an ID according to another embodiment. In this embodiment, real-time access between the handheld device and the IPL Publisher may be more readily available. In a decision step 302, if an access request is made by a cardholder for authorization to enter a secure area, for example by insertion of the individual's card into the handheld unit, authorization processing begins. In a step 304, the handheld unit requests attribute information from the IPL Publisher. In a step 306, the handheld unit receives the encrypted attribute information from the IPL Publisher for the individual requesting access. At a step 308, a decryption key is generated based on information on the card. Symmetric or asymmetric encryption techniques, or some combination thereof may be used as noted elsewhere herein. In a step 310, the encrypted attribute information is decrypted. In a step 312, the decrypted clear text attribute information is displayed on the display portion of the handheld unit. In a decision step 314, an assessment is made by the user of the handheld device whether the individual requesting access is authorized to enter the secure area based on the displayed information. If the cardholder has the appropriate attribute, access is granted, otherwise access is denied. In other embodiments, the system includes machine executable code for carrying out the above-noted steps.

In other embodiments, different encryption techniques may be used depending on the type of access requested. For example, for one type of secure access request by an individual, symmetric encryption techniques may be utilized, while for a second type of secure access request by the individual, asymmetric encryption techniques may be utilized. In this manner, the encryption technique used may be tied to the attribute needed for authorization. Further, different encryption techniques may be used for different types of information transmitted as part of the present system. For example, while symmetric encryption techniques may be used for the attribute information transmitted to a handheld unit, asymmetric encryption techniques may be used for the transmission of authorization information to the guard charged with controlling access, for example in transmission of the PIN code input by the guard to activate the handheld unit. That is, for example, the PIN code may be transmitted to a guard and encrypted using a public key encryption technique whereas the attribute information may be transmitted and encrypted using an XOR or stream cipher encryption technique.

The security system described herein offers the following beneficial features, among others. (1) Secure transmission of attribute information: non-public attribute information for a cardholder is securely transmitted for access by authorized personnel only; (2) Mobile validation: perform immediate credential validation, anywhere, requiring no real-time network connectivity or additional hardware. (3) Millions of individuals: attribute and identity information about millions of cardholders from various agencies and organizations is readily accessible. (4) Multiple, independent databases: attribute and identity data are sent to the IPL Publisher from existing databases—participating independent organizations at the city, county, and national levels are able to maintain this identity and attribute information in independent databases. (5) Always up-to-date: the secure ID checking system synchronizes dynamically using public wired or wireless connections, when such a connection is available. (6) Works when all networks are down: by always storing the most up-to-date identity and attribute information on the device, cardholders can be validated immediately without requiring a network connection to perform the operation. (7) Highly flexible: the secure ID checking system can be used for applications ranging from security at special events and mustering, to access in any bandwidth-constrained environment. (8) Comprehensive logging: all events are logged and uploaded to the Management Station during synchronization. These logs can be used to create comprehensive activity and after-action reports. (9) Available as a service: enterprises can manage the system in-house or contract for it as a service, for example, from a CoreStreet-Enabled Shared Service Provider. (10) Supported credential types: US Government issued smart cards, including: FIPS 201-compliant cards; First Responder Access Card (FRAC); Common Access Card (CAC); Transportation Worker Identity Credential (TWIC); US State Department PKI Card; Belgian Certipost eID card; Other contact and contact-less smart cards; and ID cards with 2D barcodes (e.g. driver's licenses).

The system described herein may be extended to use any type of identification credential other than the card 20 illustrated herein. Examples of such identification credentials include biometric information, electronic transmitters embedded in documents such as passports, etc. Of course, the type of handheld device or other device used may depend upon the type of identification credential that is used. For example, if biometric information is used, then the device used in connection with the system described herein may include a biometric information reader.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method for secure ID checking, comprising:
   receiving attribute information of a user, wherein at least a portion of said attribute information is encrypted attribute information;
   identifying said encrypted attribute information in response to an access request initiated by a card presented by the user, wherein the attribute information of the user is received independently of information from the card presented by the user;
   generating a decryption key for said encrypted attribute information using at least some of the information on the card;
   decrypting said encrypted attribute information using the decryption key to generate clear text attribute information;
   displaying said clear text attribute information;
   granting or denying access of the user to a secure area based on said clear text attribute information.

2. The method of claim 1, wherein generating the decryption key includes generating a symmetric decryption key.

3. The method of claim 1, wherein said attribute information is received from a secure computer.

4. An apparatus for secure ID checking, comprising:
   machine executable code for receiving attribute information of a user, wherein at least a portion of said attribute information is encrypted attribute information;
   machine executable code for identifying said encrypted attribute information in response to an access request initiated by a card presented by the user, wherein the attribute information of the user is received independently of information from the card presented by the user;
   machine executable code for generating a decryption key for said encrypted attribute information using at least some of the information from the card;
   machine executable code for decrypting said encrypted attribute information using the decryption key to generate clear text attribute information;
   machine executable code for displaying said clear text attribute information to enable granting or denying access of the user to a secure area based on said clear text attribute information.

5. The apparatus of claim 4, wherein generating the decryption key includes generating a symmetric decryption key.

6. The apparatus of claim 4, wherein said attribute information is received from a secure computer.

7. A system for secure ID checking, comprising:
   a database;
   an access control device coupled to the database and having a card reader device, wherein said access control device receives attribute information of a user from said database, and wherein at least a portion of said attribute information is encrypted; and
   a decryption device coupled to said access control device, wherein said decryption device decrypts said encrypted attribute information received from said database to generate clear text attribute information using a decryption key, wherein the decryption key is generated using information obtained by the card reader device from a card presented by the user, and wherein the attribute information of the user is received by the access control device independently of the information from the card presented by the user, and wherein a decision to grant or deny access is based on the clear text attribute information.

8. The system of claim 7, wherein said decryption key is a symmetric decryption key.

9. The system of claim 7, wherein said database is a secure computer.

10. The system of claim 7, wherein the attribute information of the user is transmitted periodically from the database to the access control device.

11. The system of claim 7, wherein the attribute information is transmitted to the access control device in response to a request from the access control device.

12. The method of claim 1, wherein the attribute information of the user is transmitted periodically from the database to the access control device.

13. The method of claim 1, wherein the attribute information of the user is transmitted to the access control device in response to a request from the access control device.

14. The apparatus of claim 4, wherein the attribute information of the user is transmitted periodically from the database to the access control device.

15. The apparatus of claim 4, wherein the attribute information of the user is transmitted to the access control device in response to a request from the access control device.

* * * * *